(12) United States Patent
Ishigaki

(10) Patent No.: US 10,491,047 B2
(45) Date of Patent: Nov. 26, 2019

(54) DEVICE FOR PERFORMING OPTICAL POWER TRANSFER FROM AN OPTICAL ENERGY SOURCE TO A LOAD

(71) Applicant: TOYOTA MOTOR ENGINEERING & MANUFACTURING NORTH AMERICA, INC., Erlanger, KY (US)

(72) Inventor: Masanori Ishigaki, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 178 days.

(21) Appl. No.: 15/440,000

(22) Filed: Feb. 23, 2017

(65) Prior Publication Data

US 2018/0241216 A1    Aug. 23, 2018

(51) Int. Cl.
*H02J 50/30* (2016.01)
*G05F 1/67* (2006.01)
*H02J 50/80* (2016.01)

(52) U.S. Cl.
CPC ............... *H02J 50/30* (2016.02); *G05F 1/67* (2013.01); *H02J 50/80* (2016.02); *Y02E 10/563* (2013.01)

(58) Field of Classification Search
CPC .. H02J 3/385; H02J 3/383; H02J 3/382; H02J 7/35; H02J 50/30; H02J 50/80; G01R 21/133; Y02E 10/58; Y02E 10/563; Y02E 10/50; Y02E 10/56; H02S 50/00; H02S 50/10; G05F 1/67
See application file for complete search history.

(56) References Cited

U.S. PATENT DOCUMENTS

| 7,079,722 | B2 | 7/2006 | Mahbobi | |
|---|---|---|---|---|
| 7,767,903 | B2* | 8/2010 | Marshall | H02S 10/30 136/243 |
| 9,274,045 | B2 | 3/2016 | Rand et al. | |
| 9,413,289 | B2 | 8/2016 | Ito et al. | |
| 2006/0062580 | A1 | 3/2006 | Mahbobi | |
| 2006/0290344 | A1* | 12/2006 | Shimotomai | G01J 1/08 324/750.02 |

(Continued)

FOREIGN PATENT DOCUMENTS

JP    2014-79126 A    5/2014

*Primary Examiner* — Que Tan Le
*Assistant Examiner* — Jennifer D Bennett
(74) *Attorney, Agent, or Firm* — Oblon, McClelland, Maier & Neustadt, L.L.P.

(57) ABSTRACT

A system includes a power transfer device having an optical energy source connected to an optical energy transmitter on a first side of the power transfer device configured to transmit optical energy to a second side of the power transfer device via a channel. An optical energy receiver on the second side of the power transfer device is configured to convert received optical energy from the optical energy transmitter into electrical energy, in which the electrical energy is configured to supply power to an electrical load. The system also includes control circuitry configured to determine voltage and power characteristics of the electrical load, configure operational parameters of the optical energy transmitter based on the voltage and power characteristics of the electrical load, and control power transfer from the primary side to the secondary side of the power transfer device.

18 Claims, 7 Drawing Sheets

(56) References Cited

U.S. PATENT DOCUMENTS

| | | | |
|---|---|---|---|
| 2009/0016715 A1* | 1/2009 | Furey | H04B 10/807 398/38 |
| 2010/0065100 A1* | 3/2010 | Nightingale | H01L 31/02021 136/244 |
| 2011/0273020 A1 | 11/2011 | Balachandreswaran et al. | |
| 2016/0197578 A1* | 7/2016 | Dupraz | G05F 1/67 250/205 |
| 2016/0218553 A1* | 7/2016 | He | H02J 7/0036 |

* cited by examiner

DEVICE FOR PERFORMING OPTICAL POWER TRANSFER FROM AN OPTICAL ENERGY SOURCE TO A LOAD

BACKGROUND

Energy can be transferred from power sources to electrical loads using optical power transfer techniques. U.S. Pat. No. 7,079,722 to Mahbobi describes an apparatus which allows for transfer of DC electrical power across a transparent or semitransparent medium such as glass using an optical source that illuminates a matched solar cell array on the other side of the medium.

SUMMARY

In an exemplary implementation, a system includes a power transfer device having an optical energy source connected to an optical energy transmitter on a first side of the power transfer device configured to transmit optical energy to a second side of the power transfer device via a channel. An optical energy receiver on the second side of the power transfer device is configured to convert received optical energy from the optical energy transmitter into electrical energy, in which the electrical energy is configured to supply power to an electrical load. The system also includes control circuitry configured to determine voltage and power characteristics of the electrical load, configure operational parameters of the optical energy transmitter based on the voltage and power characteristics of the electrical load, and control power transfer from the primary side to the secondary side of the power transfer device.

The optical energy transmitter can be at least one of a laser, a light emitting diode (LED), or a copper photoemitter.

The channel can include a calibration sensor configured to detect sensed characteristics of the optical energy transmitter. The system can be configured to modify the operational parameters of the transmitter based the sensed characteristics of the optical energy transmitter by the calibration sensor.

The optical energy receiver can be a photovoltaic cell. The system can be configured to modify the operational parameters of the optical energy transmitter based on a maximum power point tracking (MPPT) curve for the photovoltaic cell and the voltage and power characteristics of the electrical load. The system can also be configured to modify the operational parameters of the optical energy transmitter to correspond to a peak power point on the MPPT curve for the photovoltaic cell. The system can also be configured to determine the operational parameters of the optical energy transmitter to prioritize an operating voltage of the electrical load over the peak power point on the MPPT curve for the photovoltaic cell.

The secondary side of the power transfer device can also include at least one sensor device configured to detect the voltage and power characteristics of the electrical load. The at least one sensor device can include a voltage sensor connected in parallel with the electrical load. The system can be configured to modify an intensity of the optical energy transmitter based on the voltage and power characteristics of the electrical load detected at the at least one sensor device. The system can also be configured to modify a current supplied by the optical energy source to the optical energy transmitter based on the voltage and power characteristics of the electrical load detected at the at least one sensor device.

The primary side of the power transfer device can be isolated from the secondary side of the power transfer device.

In another exemplary implementation, a process includes determining voltage and power characteristics of an electrical load of a power transfer device having an optical energy source connected to an optical energy transmitter on a first side of the power transfer device configured to transmit optical energy to a second side of the power transfer device via a channel and an optical energy receiver on the second side of the power transfer device configured to convert received optical energy from the optical energy transmitter into electrical energy, in which the electrical energy is configured to supply power to the electrical load; configuring operational parameters of the optical energy transmitter based on the voltage and power characteristics of the electrical load; and controlling power transfer from the primary side to the secondary side of the power transfer device. A non-transitory computer-readable storage medium can include executable instructions, which when executed by circuitry, causes the circuitry to perform the process.

In another exemplary implementation, a system includes control circuitry configured to determine voltage and power characteristics of an electrical load of a power transfer device having an optical energy source connected to an optical energy transmitter on a first side of the power transfer device configured to transmit optical energy to a second side of the power transfer device via a channel and an optical energy receiver on the second side of the power transfer device configured to convert received optical energy from the optical energy transmitter into electrical energy, in which the electrical energy is configured to supply power to the electrical load, configure operational parameters of the optical energy transmitter based on the voltage and power characteristics of the electrical load, and control power transfer from the primary side to the secondary side of the power transfer device.

The optical energy receiver can be a photovoltaic cell. The system can modify the operational parameters of the optical energy transmitter based on a maximum power point tracking (MPPT) curve for the photovoltaic cell and the voltage and power characteristics of the electrical load. The system can also modify the operational parameters of the optical energy transmitter to correspond to a peak power point on the MPPT curve for the photovoltaic cell. The system can determine the operational parameters of the optical energy transmitter to prioritize an operating voltage of the electrical load over the peak power point on the MPPT curve for the photovoltaic cell.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
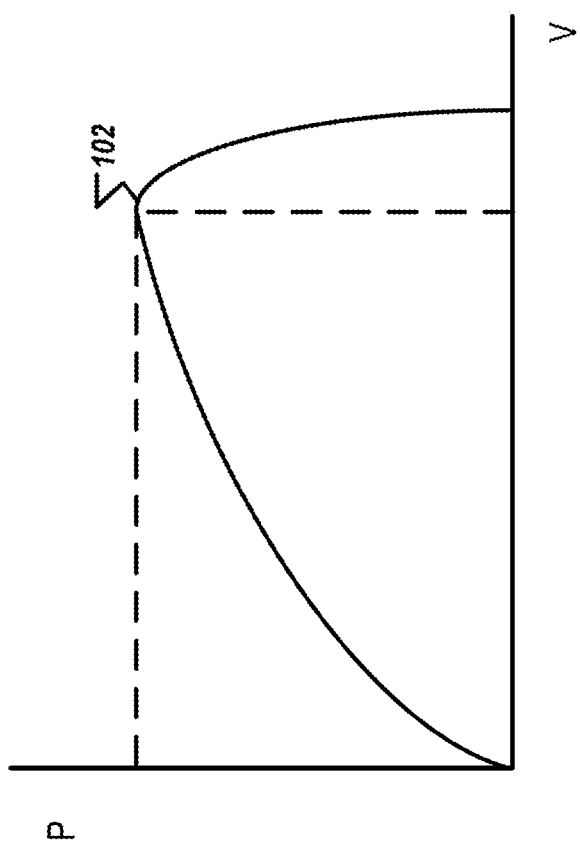
FIG. 1 is an exemplary graph of a maximum power point tracking (MPPT) curve for a photovoltaic cell.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Aspects of the present disclosure are directed to au optical power transfer device. Unlike conventional DC-DC converters, the optical power transfer device described herein transfers energy from a power supply to an electrical load without the use of switches or transformers, which results in a reduction in losses. In addition, a primary side of the optical power transfer device includes a variable intensity optical source that transmits power to a photovoltaic cell configured to operate as an optical power receiver on a secondary side of the optical power transfer device. In addition, the primary side of the optical power transfer device described herein can be perfectly isolated from the secondary side of the optical power transfer device.

In some implementations, an intensity of light output by the optical power source is based on a maximum power point tracking (MPPT) curve associated with the photovoltaic cell as well as voltage and power characteristics of the electrical load. For example, FIG. 1 is an exemplary graph 100 of a MPPT curve for a photovoltaic cell based on an intensity of received light at the photovoltaic cell. In some implementations, the optical power source is configured to output optical energy at a predetermined intensity where an output voltage corresponds to a peak power operating point 102.

Figure 2:
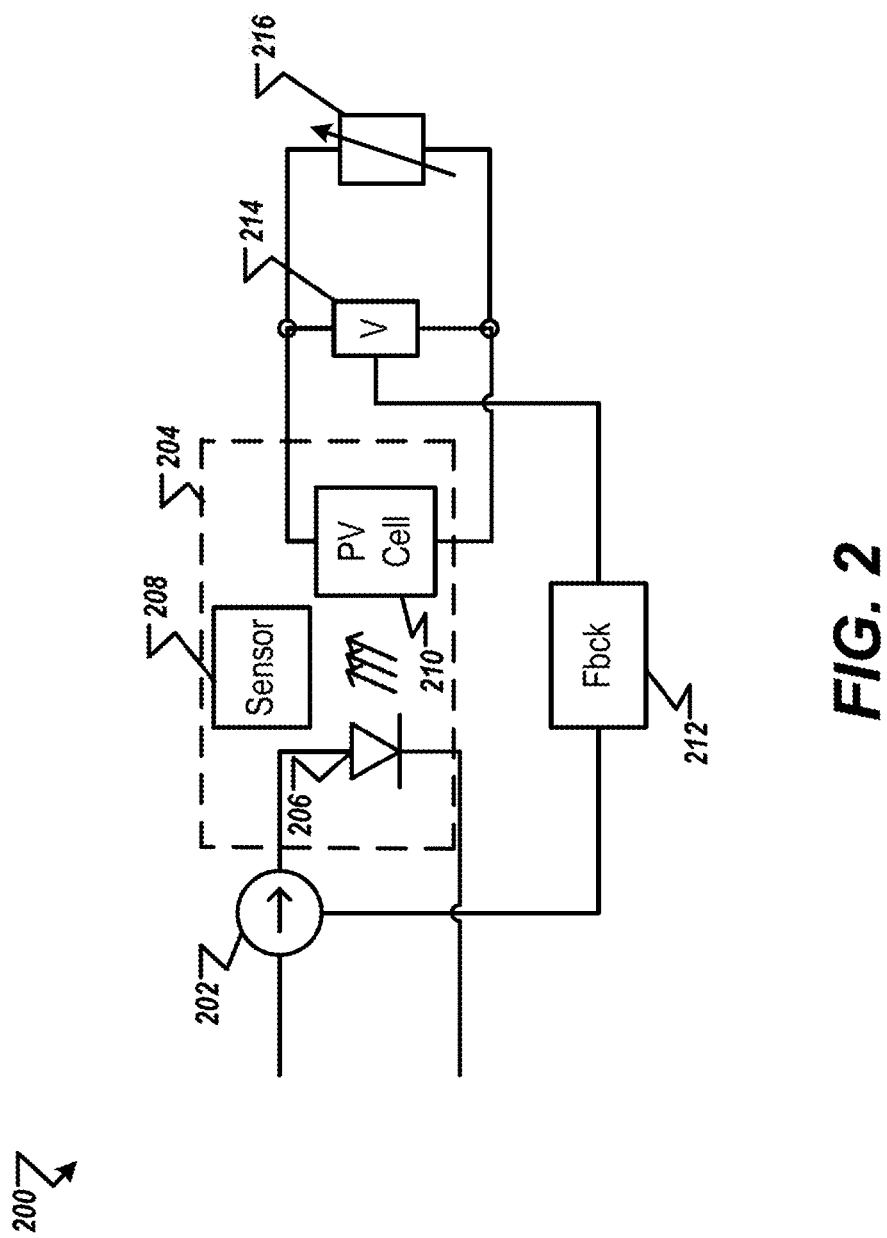
FIG. 2 is an exemplary schematic diagram of an optical power transfer device.

FIG. 2 is an exemplary schematic diagram of an optical power transfer device 200. The optical power transfer device 200 can include a primary side and a secondary side on either side of an optical channel 204. The primary side of the optical power transfer device 200 includes an optical energy source 202 that supplies power to an optical energy transmitter 206 that transmits optical energy through the optical channel 204 to the secondary side of the optical power transfer device 200. In some implementations, the optical energy source 202 is a current source associated with a power supply. For example, a power supply such as a battery cell in an electric vehicle (EV) can be the optical energy source 202 that outputs a current to the optical energy transmitter 206 corresponding to a predetermined intensity output by the optical energy transmitter 206. In some implementations the optical energy transmitter 206 can be a laser, light emitting diode (LED), copper photo-emitter, or any other type of optical energy emitter.

In some implementations, the optical power receiver 210 is a photovoltaic (PV) cell that receives the optical energy transmitted across the channel 204 by the optical energy transmitter 206. The PV cell can be configured to have a MPPT curve for a predetermined intensity having a peak power point that corresponds to a predetermined voltage associated with a load 216. If the load is a variable voltage load, the predetermined voltage can correspond to an average, minimum, maximum, or any other voltage associated with the load. In addition, the PV cell can also be configured such that a MPPT curve associated with the PV cell 210 corresponds to a predetermined intensity transmitted by the optical energy transmitter 206. For example, the PV cell of the optical power receiver 210 can be configured to have a MPPT associated with a specific intensity that corresponds to a maximum efficiency operating point of the optical energy transmitter 206 and/or optical energy source 202. Also, because the PV cell of the optical power receiver 210 is enclosed within the optical power transfer device 200, the PV cell is not exposed to environmental effects, which results in more stable operating characteristics than PV cells that collect solar energy in solar environments. In some implementations, the optical power receiver 210 can be another type of device that can convert optical energy to electrical energy, such as a photodiode, photoresistor, and the like.

The secondary side of the optical power transfer device 200 can also include at least one sensor 214 configured to detect voltage and power characteristics at the load 216. In some implementations, the at least one sensor 214 can be a voltage sensor connected in parallel with the load 216 that detects the voltage at the load. However, the at least one sensor 214 can also include a current sensor any other type of sensor. In some aspects, the voltage sensed at the sensor 214 is used to modify an intensity of optical energy output by the optical energy transmitter 206. In some implementations, feedback signal 212 is provided by a controller that outputs a control signal to modify the current output by the optical energy source 202 in order to modify an intensity of optical energy output by the optical energy transmitter 206 based on a difference between a load voltage and a sensed voltage at the sensor 214. For example, if the sensed voltage is greater than the load voltage by more than a predetermined amount, then the controller can output a control signal to reduce the current output by the optical energy source 202, which in turn causes the intensity of optical energy output by the optical energy transmitter 206 to be reduced. Likewise, if the sensed voltage is less than the load voltage by more than a predetermined amount, then the controller can output a control signal to increase the current output by the optical energy source 202, which in turn causes the intensity of optical energy output by the optical energy transmitter 206 to increase. The controller can also use sensor data obtained by the at least one sensor 214 to detect malfunctions or failures of components of the optical power transfer device 200.

In some examples, the channel 204 between the primary and secondary sides of the optical power transfer device 200 includes a calibration sensor 208 configured to detect characteristics of the optical energy source 202 and/or optical energy transmitter 206. The calibration sensor 208 can be any type of optical energy sensor, such as a photoresistor, photovoltaic cell, photodiode, and the like. In some implementations, the calibration sensor 208 can be used to calibrate an amount of optical energy transmitted into the channel 204 by the optical energy transmitter 206. For example, the controller can receive optical energy intensity sensor data from the calibration sensor 208, which can be used by the controller to determine whether to modify the intensity of optical energy output by the optical energy transmitter 206. The calibration sensor 208 can also be used to detect component malfunctions and/or failures. For example, the calibration sensor 208 can be used by the controller alone or in conjunction with the sensor 214 to isolate a component failure to the primary side or the secondary side based on the sensor data received from the calibration sensor 208 and/or the sensor 214.

The supply current output by the optical energy source 202, intensity output by the optical energy transmitter 206, and other operational characteristics of the optical power transfer device 200 can be controlled by one or more electronic control units (ECUs) or similar circuitry, which execute the operations associated with the controller. For example, sensors can be installed within battery cells of an electric vehicle (EV) that can sense battery state of charge (SOC), voltage, and the like. In an implementation, the ECUs can process sensor data, display battery SOC information, to a user, and send control signals to actuators that align the optical power transfer device 200 for power transfer operations. The ECUs can control the quantity of power transferred by the optical power transfer device 200 by controlling the intensity of optical energy output by the optical energy transmitter 206 as well as operational characteristics of other components. The ECUs can also align the optical power transfer device 200 to perform functions determined by input from a user.

In certain implementations, the optical power transfer device 200 can be installed in an electrical system of a vehicle in order to transfer power from power sources to electrical loads. In some implementations, electrical components within a vehicle can act as either power sources or electrical loads depending on the application being carried out. For example, battery cells in an electric vehicle can act as an electrical load during charging operations when the vehicle is connected via a plug to an AC outlet. On the other hand, the battery cells can also act as power sources during battery cell balancing.

Figure 3:
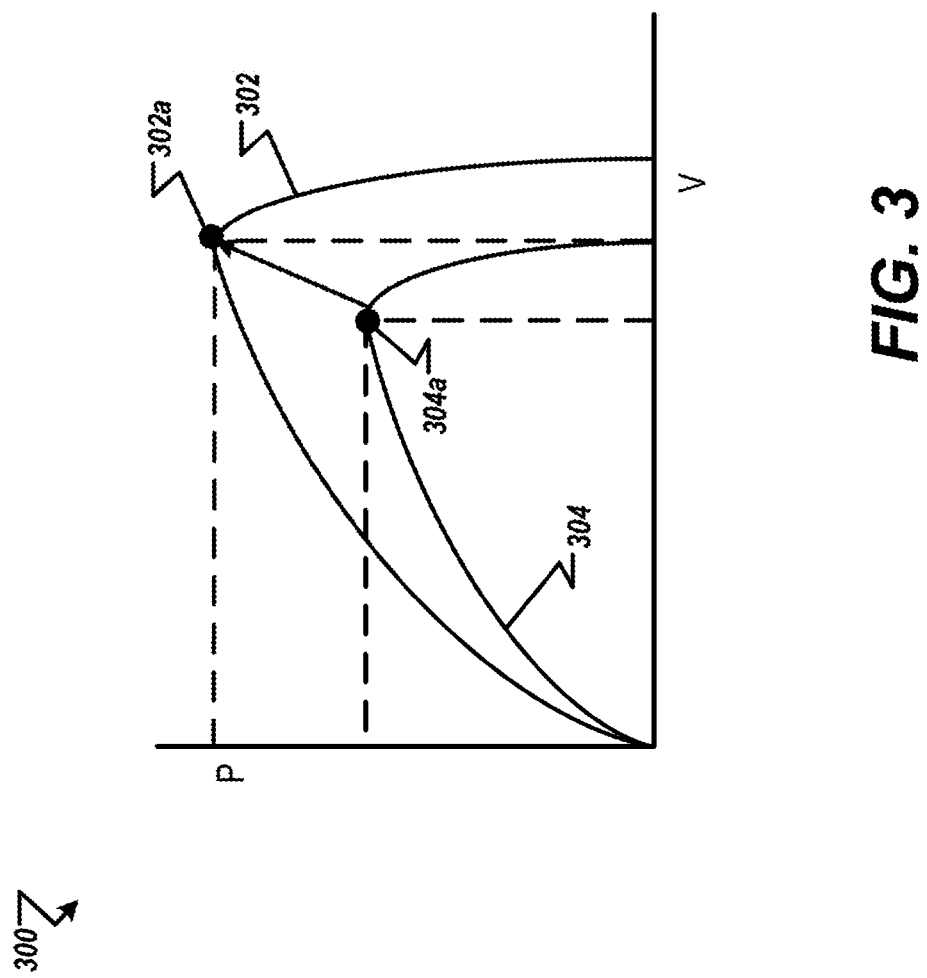
FIG. 3 is an exemplary graph of MPPT curves for various optical source intensities.

FIG. 3 is an exemplary graph 300 of MPPT curves for various optical energy source intensities for a PV cell functioning as the optical power receiver 210. The graph 300 includes MPPT curves 302 and 304 for the PV cell of the of power-voltage operating, curves for the optical power transfer device 200 that illustrate how the intensity of light energy transmitted by the light source can be varied in order to modify the voltage received by the load on the secondary side of the optical power transfer device 200 while still operating at the peak power point. For example, MPPT curve 302 is associated with a first intensity of optical energy that is greater than a second intensity associated with MPPT curve 304. In addition, peak power point 302a is associated with MPPT curve 302, and peak power point 304a is associated with MPPT curve 304. In some instances, an amount of voltage received on the secondary side of the optical power transfer device 200 remains constant while the amount of power supplied to the load 216 increases. The intensity of optical energy output by the optical energy transmitter 206 can be controlled so that the received voltage at the load 216 is prioritized over operating at the peak power point of one of the MPPT curves 302, 304 so that the operating voltage point an the MPPT curve can be shifted to be slightly greater than or less than the voltage of the peak power point.

In some implementations, in response to sensing an increase or decrease in a sensed voltage at sensor 214, the controller an increase or decrease the intensity of optical energy output by the optical energy transmitter 206 via the supply current from the optical energy source 202 to modify the received voltage at the load 216 while still operating at the peak power point of an associated MPPT curve. For example, if the intensity output by the optical energy transmitter 206 corresponds to the MPPT curve 304, and the sensor 214 senses a reduction in the received voltage and/or a load voltage increases, the controller can issue a control signal to a power supply to increase a supply current output by the optical energy source 202 such that the intensity that is output by the optical energy transmitter 206 corresponds to the MPPT curve 302 that has a peak power point at a higher voltage than the MPPT curve 304.

Figure 4:
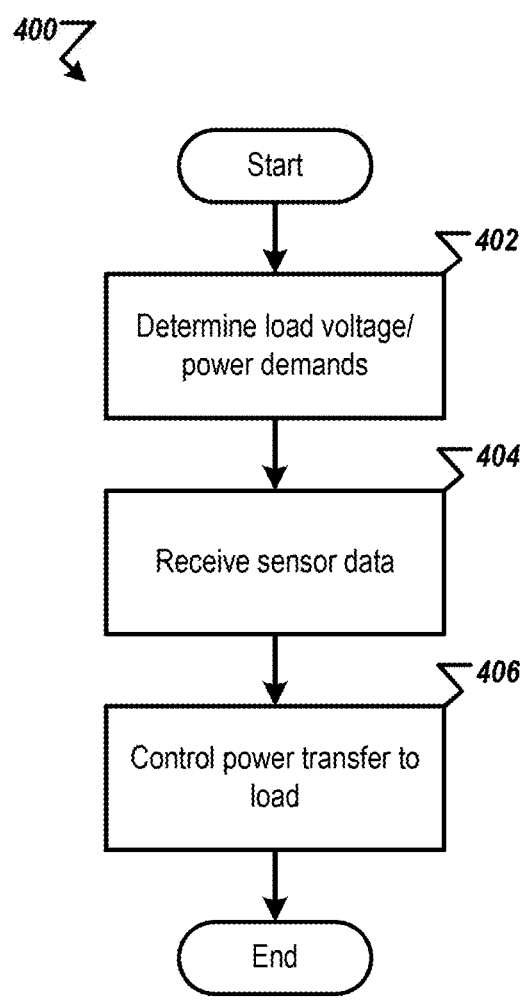
FIG. 4 is an exemplary flowchart of an optical power transfer process.

FIG. 4 is an exemplary flowchart of an optical power transfer process 400. The optical power transfer process 400 can be controlled by one or more ECUs or similar circuitry that perform the functions of the controller described herein. Sensors installed within one or more battery cells and other electrical components of an EV power transfer system can sense battery SOC, voltage, current, and the like. The ECUs can process sensor data, display electric power module information to a user, and send control signals to actuators that align the EV power transfer system to maintain continuous power to the electrical components. In some implementations, the actuators send control signals to control the intensity of optical energy output by the optical energy transmitter 206 as well as operating characteristics of other components of the optical power transfer device 200. The ECUs can also align a plurality of optical power transfer devices to perform power transfer among a one or more sources and/or loads within an EV power transfer system. In addition, the optical power transfer process 400 is described herein with respect to the optical power transfer device 200, but it can be understood that the process 400 can also be applied to other optical power transfer device configurations.

At step 402, voltage and/or power demands of the load 216 are determined by the controller. In some implementations, the load 216 may have a constant voltage but can also have variable voltage characteristics. The secondary side of the optical power transfer device 200 may supply power to multiple loads that have different voltage and power characteristics. For example, the optical power transfer device 200 may supply power from battery cells to electrical loads such as power steering, heaters, brakes, and other types of vehicular loads that each operate at varied voltages. Based on which loads are operating and a given time, the voltage and power characteristics of the load 216 may vary. In some implementations, the controller determines the power and voltage characteristics of the load 216 based on status signals received from each of the loads associated with the optical power transfer device 200. The status signal can include whether the load is in use or in standby as well as operational parameters associated with the load (e.g., voltage, current, and power demands).

At step 404, the controller receives calibration data from calibration sensor 208 installed within the channel 204 between the primary and secondary sides of the optical power transfer device 200 as well as sensor data from the sensor 214 from the sensor on the secondary side of the optical power transfer device 200. The secondary side of the optical power transfer device 200 can also include at least one sensor 214 configured to detect voltage and power characteristics at the load 216. In some implementations, the at least one sensor 214 can be a voltage sensor connected in parallel with the load 216 that detects the voltage at the load. However, the at least one sensor 214 can also include a current sensor or any other type of sensor. In some aspects, the voltage sensed at the sensor 214 is used to modify an intensity of optical energy output by the optical energy transmitter 206.

In some examples, the channel 204 between the primary and secondary sides of the optical power transfer device 200 includes calibration sensor 208 configured to detect characteristics of the optical energy source 202 and/or optical energy transmitter 206. The calibration sensor 208 can be any type of optical energy sensor, such as a photoresistor, photovoltaic cell, and the like. In some implementations, the calibration sensor 208 can be used to modify operational parameters of the optical power transmitter 206 as well as other operational parameters of the optical power transfer device 200 in order to calibrate an amount of optical energy transmitted into the channel 204 by the optical energy transmitter 206.

At step 406, the controller controls power transfer from the optical energy transmitter 202 to the load 216. In some aspects, the controller determines operational parameters for the optical energy source 202 and optical energy transmitter 206 based on the sensor data received from the calibration sensor 208 and/or the sensor 214 as well as the power and voltage characteristics of the load 216. In some implementations, feedback signal 212 is provided by a controller that outputs a control signal to modify the current output by the optical energy source 202 in order to modify an intensity of optical energy output by the optical energy transmitter 206 based on a difference between a load voltage and a sensed voltage at the sensor 214. For example, if the sensed voltage is greater than the load voltage by more than a predetermined amount, then the controller can output a control signal to reduce the current output by the optical energy source 202, which in turn causes the intensity of optical energy output by the optical energy transmitter 206 to be reduced. Likewise, if the sensed voltage is less than the load voltage by more than a predetermined amount, then the controller can output a control signal to increase the current output by the optical energy source 202, which in turn causes the intensity of optical energy output by the optical energy transmitter 206 to increase. The controller can also use sensor data obtained by the at least one sensor 214 to detect malfunctions or failures of components of the optical power transfer device 200.

In addition, the optical energy intensity sensor data received from the calibration sensor 208 can also be used by the controller to determine whether to modify the intensity of optical energy emitted by the optical energy transmitter 206. The calibration sensor 208 can also be used to detect component malfunctions and/or failures. For example, the calibration sensor 208 can be used by the controller alone or in conjunction with the sensor 214 to isolate a component failure to the primary side or the secondary side based on the sensor data received from the calibration sensor 208 and/or the sensor 214.

Figure 5:
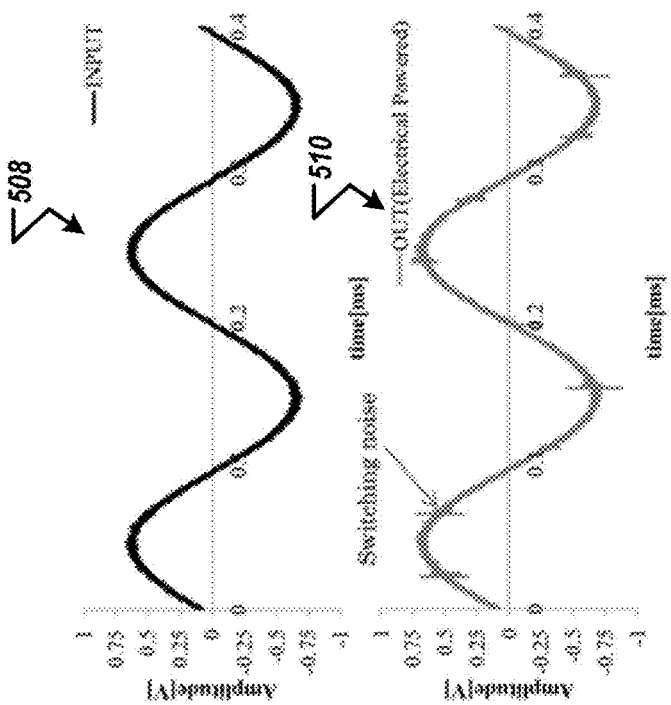
FIG. 5 illustrates operation of a power system including a DC-DC converter.
Figure 5:
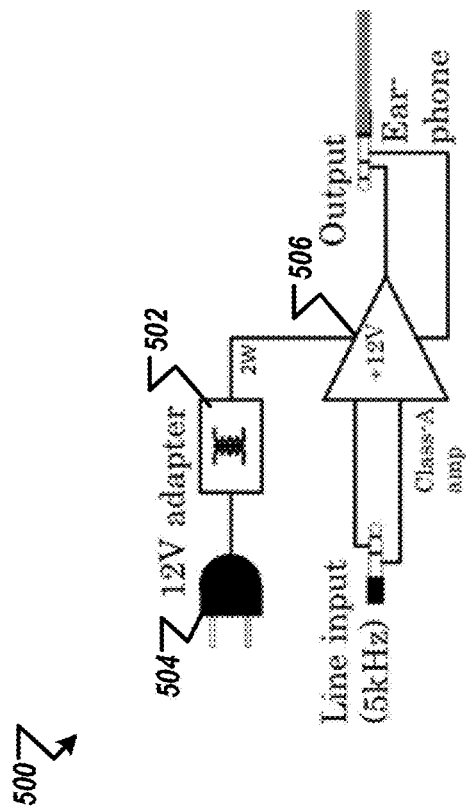
Figure 6:
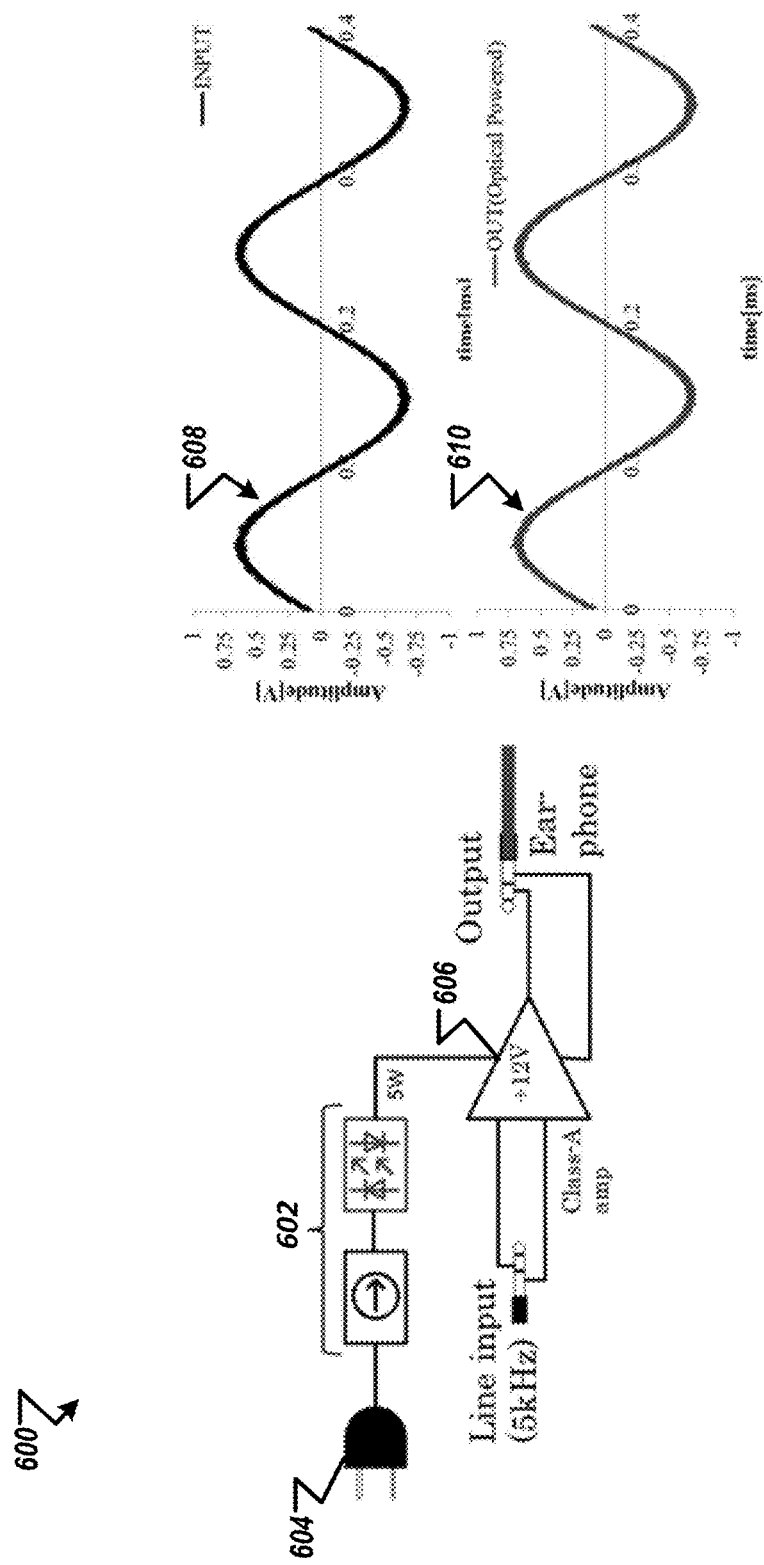
FIG. 6 illustrates operation of a power system including an optical power transfer device.

FIGS. 5 and 6 illustrate applications of two types of power transfer devices. For example, FIG. 5 illustrates operation of a power system 500 for an audio device including a switching DC-DC converter 502, and FIG. 6 illustrates operation of a power system 600 for an audio device including an optical power transfer device 602, such as the optical power transfer device 200.

As shown in FIG. 5, the DC-DC converter 502 connects a commercial power tap 504 to a power amplifier 506 for an audio device. Graph 508 illustrates an input voltage from the power tap 504 to the DC-DC converter 502, and graph 510 illustrates an output voltage from the DC-DC converter 502 to the amplifier 506. The output voltage curve in graph 510 has a number of spikes that correspond to switching noise of the DC-DC converter 502. In order to remove the spikes from the output voltage curve due to switching, filters can be installed in the power system 500, which takes up additional space and increases cost of the power system 500.

Turning to FIG. 6, the optical power transfer device 602 connects a commercial power tap 604 to a power amplifier 606 for an audio device. Graph 608 illustrates an input voltage from the power tap 604 to the DC-DC converter 602, and graph 610 illustrates an output voltage from the DC-DC converter 602 to the amplifier 606. Because the optical power transfer device 602 does not include switches and thus does not suffer from switching noise, the output voltage curve in graph 610 does not include switching noise spikes like the output voltage curve in graph 510 for the switching DC-DC converter implementation.

Aspects of the present disclosure are directed to an optical power transfer device that provides for total isolation between primary and secondary sides of the optical power transfer device without being subjected to switching and wire losses that conventional switching power conversion devices are subjected to. In addition, the optical power transfer device is able to vary an amount of power transferred from the primary side to the secondary side of the optical power transfer device by varying an intensity of optical energy output from an optical energy transmitter.

Blocks or circuits of computer architecture (i.e., circuitry) shown or described herein can be implemented in a single processing system, or distributed across a plurality of processing systems, which may be referred to as separate processors or circuits. For instance, each of the blocks of architecture can be a discrete processor system, or logic component. Further, exemplary functions or features can be performed by common circuitry or by a general purpose processor executing specific instructions.

Figure 7:
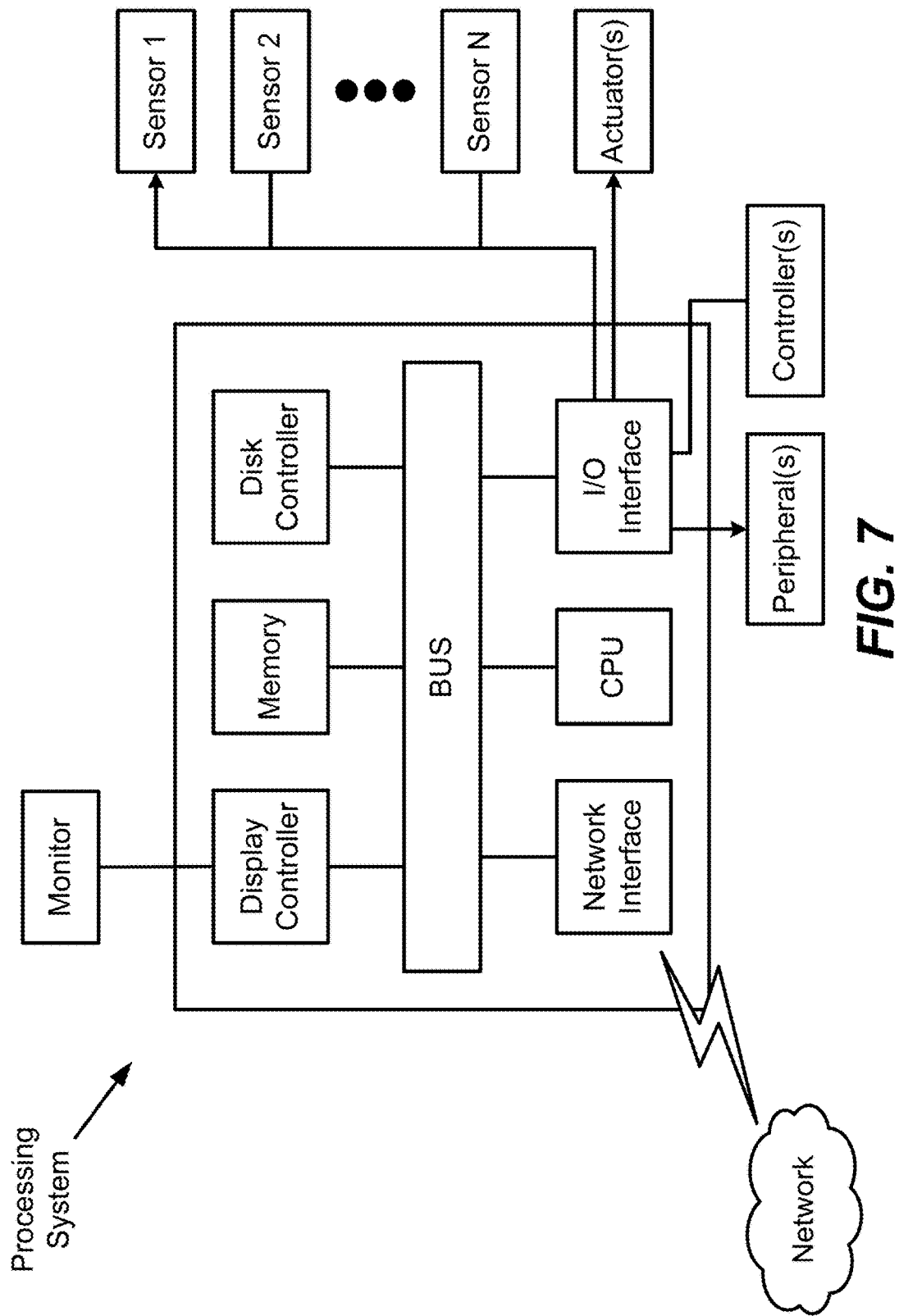
FIG. 7 schematically illustrates a processing system, such as a controller and/or a computer system.

FIG. 7 illustrates an exemplary processing system (i.e., an exemplary processor or circuitry). One or more of such processing systems can be utilized in or to execute one or more algorithms, or portions thereof, or one or more architecture blocks, or portions thereof, in accordance with the descriptions provided herein. The system can be embodied and/or implemented as an electronic control unit (ECU) or a discrete computer installed in a vehicle.

The exemplary processing system can be implemented using one or more microprocessors or the equivalent, such as a central processing unit (CPU) and/or at least one application specific processor ASP (not shown). The microprocessor is circuitry that utilizes a computer readable storage medium, such as a memory circuit (e.g., ROM, EPROM, EEPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities, of a multi-cored CPU. Control circuitry provided by one or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. The display controller or portions thereof can also be incorporated into the CPU. Additionally, an I/O (input/output) interface is provided for inputting signals and/or data from a microphone, speakers, cameras, a mouse, a keyboard, a touch-based display or pad interface, etc., which can be connected to the I/O interface as a peripheral. For example, a keyboard Or a pointing device for controlling parameters of the various processes or algorithms of this disclosure can be connected to the I/O interface to provide additional functionality and configuration options, or control display characteristics. Moreover, the monitor can be provided with a touch-sensitive or gesture-detecting interface for providing a command/instruction interface.

In an exemplary implementation, the I/O interface is provided for inputting sensor data from Sensors 1, 2 . . . N. The sensors can include battery voltage sensors, temperature sensors, current sensors, or sensors that can detect opening or closing of a switch. Other sensors that input data to the I/O interface may include velocity sensors, acceleration sensors, steering sensors, gyroscope sensors, and the like. In addition, the I/O interface is provided for inputting data from one or more controllers that enable a user to control the configuration of the isolated DC-DC power conversion circuit 120 or distributed power system. For example, the user can use the controller to set up default intensities for the optical energy transmitter 206 of the optical power transfer device. The I/O interface can also provide an interface for outputting control signals to one or more actuators to control various actuated components. In some implementations, the actuators send control signals to control the supply current output by the optical energy source 202, which causes the intensity of optical energy output by the optical energy transmitter 206 to increase or decrease in response to changes in the supply current.

The I/O interface can also be connected to a mobile device, such as a smartphone and/or a portable storage device. The I/O interface can include a Universal Serial Bus (USB) hub, Bluetooth circuitry, Near Field Communication (NFC) circuitry, or other wired or wireless communication circuits. In some aspects, the mobile device can provide sensor input, navigation input, and/or network access.

The above-noted components can be coupled to a network, such as the Internet or a local intranet, via a network interface for the transmission or reception of data, including controllable parameters. The network interface can include one or more IEEE 802 compliant circuits. A central BUS is provided to connect the above hardware components/circuits together and provides at least one path for digital communication there between.

The processing system may be a networked desktop computer, terminal, or personal device, such as a tablet computer or a mobile phone. The database discussed above may be stored remotely on a server, and the server may include components similar to or the same as the processing system. These devices may communicate via the network.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as a device, system, method, or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product Examples include CDs, DVDs, flash drives, hard disk units, ROMs, RAMS, and other memory devices.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process, such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A system comprising:
a power transfer device including
an optical energy source connected to an optical energy transmitter on a first side of the power transfer device, the optical energy transmitter being configured to transmit optical energy to a second side of the power transfer device via a channel, and
an optical energy receiver on the second side of the power transfer device configured to convert received optical energy from the optical energy transmitter into electrical energy to supply power to an electrical load; and
control circuitry including at least a microcontroller configured to
determine voltage and power characteristics of the electrical load,
configure operational parameters of the optical energy transmitter based on the voltage and power characteristics of the electrical load, and
control power transfer from the first side to the second side of the power transfer device,
wherein the optical energy receiver is a photovoltaic cell having a maximum power point tracking (MPPT) curve, and the control circuitry prioritizes an operating voltage of the electrical load over a peak power point on the MPPT curve for the photovoltaic cell.

2. The system of claim 1, wherein the optical energy transmitter is at least one of a laser, a light emitting diode (LED), or a copper photo-emitter.

3. The system of claim 1, wherein the channel includes a calibration sensor configured to detect sensed characteristics of the optical energy transmitter.

4. The system of claim 3, wherein the control circuitry is configured to modify the operational parameters of the optical energy transmitter based the sensed characteristics of the optical energy transmitter by the calibration sensor.

5. The system of claim 1, wherein the control circuitry is further configured to modify the operational parameters of the optical energy transmitter based on the MPPT curve for the photovoltaic cell and the voltage and power characteristics of the electrical load.

6. The system of claim 5, wherein the control circuitry is further configured to modify the operational parameters of the optical energy transmitter to correspond to the peak power point on the MPPT curve for the photovoltaic cell.

7. The system of claim 6, wherein the control circuitry is further configured to determine the operational parameters of the optical energy transmitter to prioritize the operating voltage of the electrical load over the peak power point on the MPPT curve for the photovoltaic cell.

8. The system of claim 1, wherein the second side of the power transfer device further includes at least one sensor device configured to detect the voltage and power characteristics of the electrical load.

9. The system of claim 8, wherein the at least one sensor device includes a voltage sensor connected in parallel with the electrical load.

10. The system of claim 9, wherein the control circuitry is further configured to modify an intensity of the optical energy transmitter based on the voltage and power characteristics of the electrical load detected at the at least one sensor device.

11. The system of claim 9, wherein the control circuitry is further configured to modify a current supplied by the optical energy source to the optical energy transmitter based on the voltage and power characteristics of the electrical load detected at the at least one sensor device.

12. The system of claim 1, wherein the first side of the power transfer device is isolated from the second side of the power transfer device.

13. A method, comprising:
determining voltage and power characteristics of an electrical load of a power transfer device having an optical energy source connected to an optical energy transmitter on a first side of the power transfer device, the optical energy source being configured to transmit optical energy to a second side of the power transfer device via a channel, and an optical energy receiver on the second side of the power transfer device configured to convert received optical energy from the optical energy transmitter into electrical energy to supply power to the electrical load;
configuring operational parameters of the optical energy transmitter based on the voltage and power characteristics of the electrical load; and
controlling power transfer from the first side to the second side of the power transfer device,
wherein the optical energy receiver is a photovoltaic cell having a maximum power point tracking (MPPT) curve, and an operating voltage of the electrical load is prioritized over a peak power point on the MPPT curve for the photovoltaic cell.

14. A non-transitory computer-readable storage medium including executable instructions, which when executed by circuitry, causes the circuitry to perform the method according to claim 13.

15. A system comprising:
control circuitry configured to
determine voltage and power characteristics of an electrical load of a power transfer device having an optical energy source connected to an optical energy transmitter on a first side of the power transfer device, the optical energy transmitter being configured to transmit optical energy to a second side of the power transfer device via a channel and an optical energy receiver on the second side of the power transfer device configured to convert received optical energy from the optical energy transmitter into electrical energy to supply power to the electrical load,
configure operational parameters of the optical energy transmitter based on the voltage and power characteristics of the electrical load, and
control power transfer from the first side to the second side of the power transfer device,
wherein the optical energy receiver is a photovoltaic cell having a maximum power point tracking (MPPT) curve, and the control circuitry prioritizes an operating voltage of the electrical load over a peak power point on the MPPT curve for the photovoltaic cell.

16. The system of claim 15, wherein the control circuitry is further configured to modify the operational parameters of the optical energy transmitter based on the MPPT curve for the photovoltaic cell and the voltage and power characteristics of the electrical load.

17. The power transfer device of claim 16, wherein the control circuitry is further configured to modify the operational parameters of the optical energy transmitter to correspond to a peak power point on the MPPT curve for the photovoltaic cell.

18. The power transfer device of claim 17, wherein the control circuitry is further configured to determine the operational parameters of the optical energy transmitter to prioritize the operating voltage of the electrical load over a peak power point on the MPPT curve for the photovoltaic cell.

\* \* \* \* \*